(12) United States Patent
Kuwano et al.

(10) Patent No.: US 12,333,707 B2
(45) Date of Patent: Jun. 17, 2025

(54) IMAGE AND INSPECTION SYSTEM

(71) Applicant: MITSUBISHI HEAVY INDUSTRIES, LTD., Tokyo (JP)

(72) Inventors: Toshihiro Kuwano, Tokyo (JP); Kazuki Miyabe, Tokyo (JP); Takaaki Sakamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 430 days.

(21) Appl. No.: 17/726,335

(22) Filed: Apr. 21, 2022

(65) Prior Publication Data
US 2023/0051696 A1 Feb. 16, 2023

(30) Foreign Application Priority Data
Aug. 13, 2021 (JP) .................. 2021-131916

(51) Int. Cl.
*G09G 5/377* (2006.01)
*G06F 3/14* (2006.01)
*G06T 7/00* (2017.01)

(52) U.S. Cl.
CPC .... *G06T 7/001* (2013.01); *G06T 2207/30156* (2013.01)

(58) Field of Classification Search
CPC ......... G06T 7/001; G06T 2207/30156; G09G 5/377; G09G 2340/10; G09G 2340/16; G06F 3/14
See application file for complete search history.

(56) References Cited

U.S. PATENT DOCUMENTS

| 6,970,588 | B1 * | 11/2005 | Komatsu ................. G06T 7/001 382/141 |
| 2003/0093288 | A1 | 5/2003 | Imabeppu et al. |
| 2009/0049094 | A1 * | 2/2009 | Howell ................. G06Q 50/12 |
| 2013/0282418 | A1 | 10/2013 | Furman et al. |
| 2018/0182090 | A1 * | 6/2018 | Yamagishi .............. G06T 7/001 |
| 2020/0312028 | A1 * | 10/2020 | Charvat ................. G05D 1/101 |

FOREIGN PATENT DOCUMENTS

| JP | H10301986 A | 11/1998 |
| JP | 2014092981 A | 5/2014 |
| JP | 2015011519 A | 1/2015 |
| JP | 2018096660 A | 6/2018 |
| JP | 6989481 B2 * | 1/2022 |

OTHER PUBLICATIONS

Office Action for Japanese Application No. 2021-131916 mailed Mar. 22, 2023; 12pp.

* cited by examiner

*Primary Examiner* — Amandeep Saini
*Assistant Examiner* — Emma Rose Goebel
(74) *Attorney, Agent, or Firm* — HAUPTMAN HAM, LLP

(57) ABSTRACT

Provided is an image and an inspection system that make it possible to effectively utilize a result of past inspection. An audit position indicating a position where an audit is planned or a position where an audit is completed and a past audit position indicating a position where an audit was performed in the past within a predetermined range including the audit position are displayed over a map on a user terminal, the map being a drawing representing a configuration of a manufacturing site. The inspector references the map on the user terminal and effectively utilizes a past audit result to perform an audit.

16 Claims, 13 Drawing Sheets

IMAGE AND INSPECTION SYSTEM

RELATED APPLICATIONS

The present application claims priority of Japan Application Number 2021-131916 filed Aug. 13, 2021, the disclosure of which is hereby incorporated by reference herein in its entirety.

TECHNICAL FIELD

The present disclosure relates to an image and an inspection system.

BACKGROUND ART

In manufacturing sites, on-site checks such as an audit are performed in order to suppress quality defects. When an audit is performed, an inspector goes to the site and performs an audit in accordance with predetermined audit items.

Patent Literature 1 discloses that, when an audit of a factory is performed, a client unit transmits a desired audit item to the server unit via a communication network, and the client unit then receives audit target data (image data) selected based on the audit item and performs the audit based on the audit target data.

CITATION LIST

Patent Literature

[PTL 1]
Japanese Patent Application Laid-Open No. 2003-150672

SUMMARY OF INVENTION

Technical Problem

When performing an audit, however, it is difficult to effectively utilize a result of a past audit even though an audit is performed regularly. Without effective use of results of past audits, information may not be sufficiently shared between an inspector of the previous audit and an inspector of the current audit, for example, and individual differences may affect an audit result. Further, without effective use of results of past audits, a part where sufficient audits have not been performed at a manufacturing site may occur. That is, there is room for increase in efficiency, improvement in accuracy, or the like in an inspection operation such as an audit at a manufacturing site or the like.

The present disclosure has been made in view of such circumstances and intends to provide an image and an inspection system that makes it possible to effectively utilize a result of past inspection.

Solution to Problem

The first aspect of the present disclosure is an image that displays an inspection position and a past inspection position over a drawing representing a configuration of a manufacturing site, the inspection position indicating a position where inspection is planned or a position where inspection is completed, and the past inspection position indicating a position where inspection was performed in the past within a predetermined range including the inspection position.

Advantageous Effects of Invention

The present disclosure achieves an advantageous effect that a result of past inspection can be effectively utilized.

DESCRIPTION OF EMBODIMENTS

One embodiment of an image and an inspection system according to the present disclosure will be described below with reference to the drawings.

Figure 1:
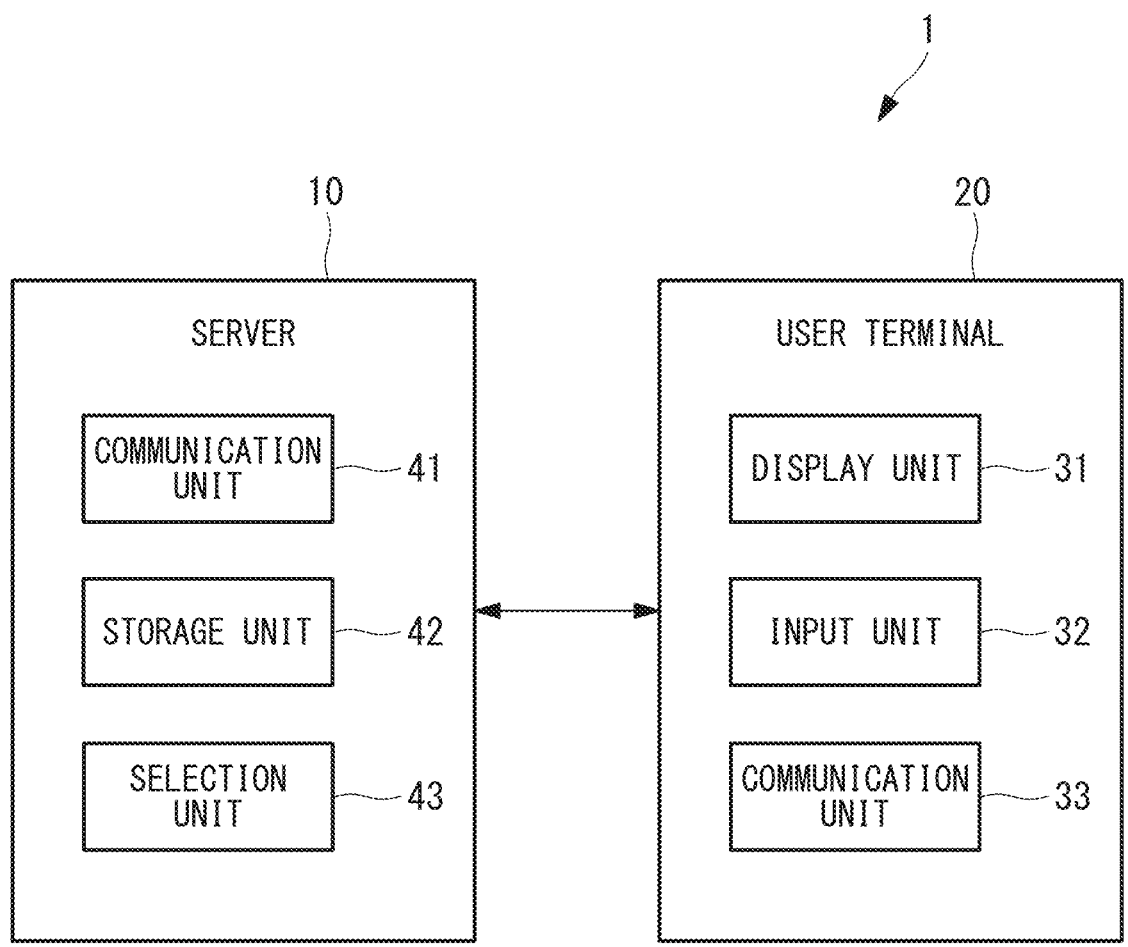
FIG. 1 is a diagram illustrating a general configuration of an inspection system according to one embodiment of the present disclosure.

FIG. 1 is a diagram illustrating a general configuration of an inspection system 1 according to one embodiment of the present disclosure. As illustrated in FIG. 1, the inspection system 1 according to the present embodiment includes a user terminal 20 and a server 10 as main components.

In the present embodiment, a case where the inspection system 1 is applied to an audit at a manufacturing site will be described as an example. Inspection encompasses broad meanings including audit, checking, surveillance, and the like. Thus, the inspection system 1 may be applied to other inspection operations without limitation to an audit.

Figure 2:
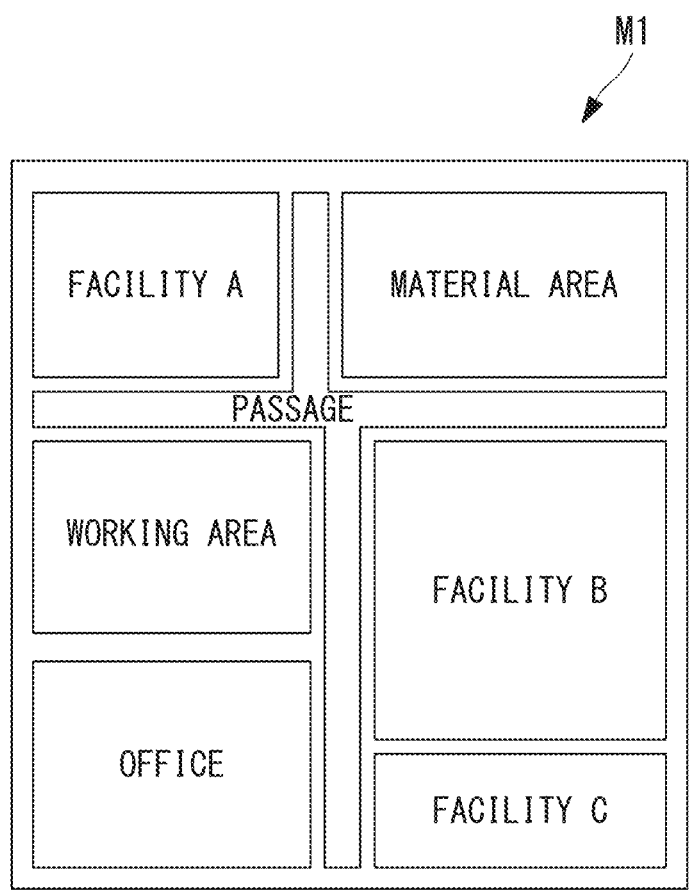
FIG. 2 is a diagram illustrating a configuration example of a manufacturing site according to one embodiment of the present disclosure.

In the present embodiment, a configuration illustrated as a map M1 in FIG. 2 will be described as an example of a manufacturing site. Specifically, the manufacturing site has a facility A, a facility B, a facility C, a material area, a working area, an office, and passages. The configuration of a manufacturing site is not limited to that of FIG. 2.

The user terminal 20 is a terminal referenced and operated by a user. Specifically, the user terminal 20 is a tablet terminal, for example. The user terminal 20 may be an information processing terminal such as a PC or a smartphone without limitation to a tablet. An inspector brings the user terminal 20 and performs an audit when performing the audit at the manufacturing site.

As illustrated in FIG. 1, the user terminal 20 includes a display unit 31, an input unit 32, and a communication unit 33 as functions.

On the display unit 31, various information is displayed so that the inspector (inspecting worker) can reference the information. Specifically, as described later, an image is displayed on the display unit 31. In the image, an audit position (inspection position) indicating a position where an audit is planned or a position where an audit is completed and a past audit position (past inspection position) indicating a position of an audit performed in the past within a predetermined range including the audit position are displayed over a diagram (map M1) illustrating the configuration of a manufacturing site.

The input unit 32 accepts various instructions so that the inspector can operate the user terminal 20. When the user terminal 20 is a tablet, the input unit 32 accepts an instruction via a touch operation performed on a display.

The communication unit 33 transmits and receives information to and from the server 10 via a communication line such as the Internet.

The server 10 selects and provides necessary information to the user terminal 20. Further, the server 10 accumulates information transmitted from the user terminal 20. The server 10 can transmit and receive information to and from the user terminal 20 via a communication line such as the Internet.

Figure 3:
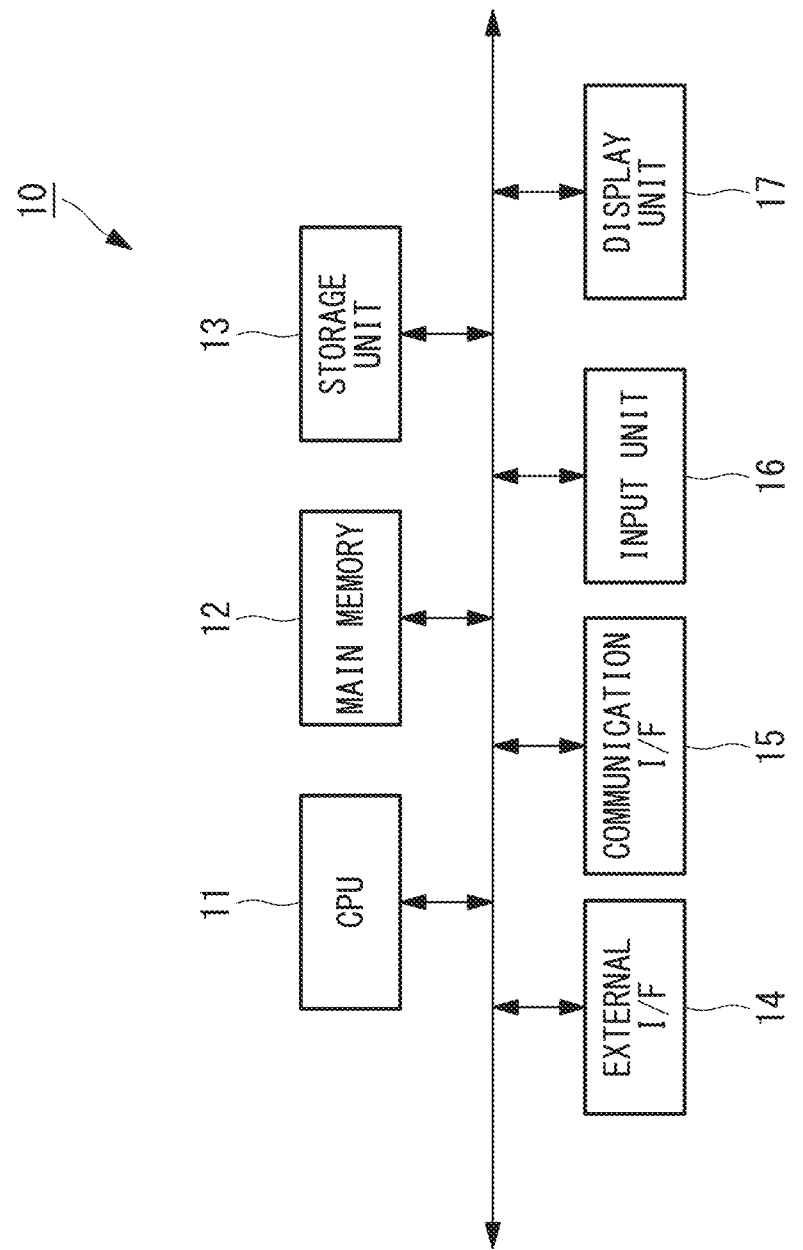
FIG. 3 is a general configuration diagram illustrating an example of a hardware configuration of a server according to one embodiment of the present disclosure.

FIG. 3 is a general configuration diagram illustrating an example of a hardware configuration of the server 10 according to one embodiment of the present disclosure. As illustrated in FIG. 3, the server 10 is a so-called computer and includes, for example, a central processing unit (CPU) 11, a main memory 12, a storage unit 13, an external interface 14, a communication interface 15, an input unit 16, a display unit 17, and the like. These components are connected to each other directly or indirectly via a bus to perform various processes in cooperation with each other.

The CPU 11 performs control by using operating system (OS) stored in the storage unit 13 connected via the bus, for example, and executes various programs stored in the storage unit 13 to perform various processes.

The main memory 12 is formed of a rewritable memory such as a cache memory, a random access memory (RAM), or the like, for example, and utilized as a work area where an execution program executed by the CPU 11 is read, data processed by the execution program is written, and the like.

The storage unit 13 is a non-transitory computer readable storage medium and may be, for example a read only memory (ROM), a hard disk drive (HDD), a flash memory, or the like. For example, the storage unit 13 stores OS used for controlling the entire device, such as Windows (registered trademark), iOS (registered trademark), Android (registered trademark), or the like, basic input/output system (BIOS), various device drivers used for operating peripherals as hardware, various application software, various data or files, and the like. Further, the storage unit 13 stores a program used for implementing various processes and various data required for implementing various processes.

The external interface 14 is an interface to be connected to an external device. An example of the external device may be an external monitor, a USB memory, an external HDD, or the like. Note that, although only a single external interface is depicted in the example illustrated in FIG. 1, a plurality of external interfaces may be provided.

The communication interface 15 is connected to a network to communicate with another device and functions as an interface used for transmitting and receiving information. The communication interface 15 communicates with another device via a wired connection or a wireless connection, for example. The wireless communication may be communication using Bluetooth (registered trademark), Wi-Fi, a dedicated communication protocol, or the like. An example of the wired communication may be a wired local area network (LAN) or the like.

The input unit 16 is a user interface such as a keyboard, a mouse, a touchpad, or the like, for example, through which the user provides an instruction.

The display unit 17 is a liquid crystal display, an organic electroluminescence (EL) display, or the like, for example. Further, the display unit 17 may be a touch panel display on which a touch panel is overlapped.

For the hardware configuration of the user terminal 20, a basic function as a so-called computer is the same as that of the server 10.

As illustrated in FIG. 1, the server 10 includes a communication unit 41, a storage unit 42, and a selection unit 43 as functions. In the present embodiment, although the server 10 is provided separately from the user terminal 20, the function of the server 10 may be included in the user terminal 20. That is, the place of each function illustrated as an example in the present embodiment is not limited to the above.

The function implemented by respective units is realized by processing circuitry, for example. For example, a series of operations for implementing the functions described below is stored in the storage unit 13 in a form of a program as an example, and the CPU 11 loads such a program into the main memory 12 and performs information processing and computing process, and thereby various functions are implemented.

Note that a form in which a program is installed in advance in the storage unit 13, a form in which a program is provided in a state of being stored in a computer readable storage medium, a form in which a program is delivered via a wired or wireless communication unit, or the like may be applied. The computer readable storage medium is a magnetic disk, a magneto-optical disk, a CD-ROM, a DVD-ROM, a semiconductor memory, or the like.

The communication unit 41 transmits and receives information to and from the user terminal 20 via a communication line such as the Internet. Specifically, the communication unit 41 acquires various information such as an audit position or an audit result input to the user terminal 20 by an inspector.

For example, the inspector uses the user terminal 20 to perform an audit and inputs a result of the audit to the user terminal 20 at a manufacturing site. Input information may be, for example, an audit position where an audit is completed for a predetermined audit item (inspection item), an inspector (for example, the name), audit date and time, the content of a countermeasure (the content of a measure) for an audit item, and the like.

Further, for example, the inspector inputs, to the user terminal 20, a position where an audit is planned (audit position) before the audit.

Once information such as an audit position (a position where an audit is planned or a position where an audit is completed) is input at the user terminal 20 in such a way, the information such as an audit position is transmitted from the user terminal 20 to the server 10 and acquired by the communication unit 41.

The storage unit 42 stores audit items and audit positions in association with each other as past audit information (past inspection information). The past audit information will include position information (audit position) of an audit performed in the past. Note that the storage unit 42 may store the past audit information in a storage unit provided to the server 10 or may store the past audit information in a storage unit provided separately from the server 10.

More specifically, the storage unit 42 stores information on the audit result acquired by the communication unit 41 in a comprehensive manner as the past audit information. For example, audit items, audit positions, inspectors, audit date and time, contents of countermeasures for audit items, and the like are stored in association with each other. In such a way, pieces of information on audits performed in the past are collected in the past audit information and can be utilized.

The selection unit 43 selects data from the past audit information. The selection unit 43 defines an audit position acquired from the user terminal 20 (a position where an audit is planned or a position where an audit is completed) as a target audit position (target inspection position). Information on an audit performed in the past in an area around the target audit position is then selected as related audit information (related inspection information) out of the past audit information. That is, the related audit information will include the past audit position indicating a position of an audit performed in the past in an area around the target audit position.

The area around a target audit position is an area within a predetermined range including the target audit position. The predetermined range is not limited as long as a range of an area around a target audit position is set. For example, the predetermined range is a range surrounded by a circle having a radius of 5 m about a target audit position. The radius is not limited to 5 m and may be suitably set.

Although the selection unit 43 selects related audit information that is the past audit result for an area around a target audit position, the past audit result to be selected may be an audit result for the same audit item as the audit item corresponding to a target audit position or may be an audit result for a different audit item.

The related audit information is then transmitted to the user terminal 20 by the communication unit 41.

Figure 4:
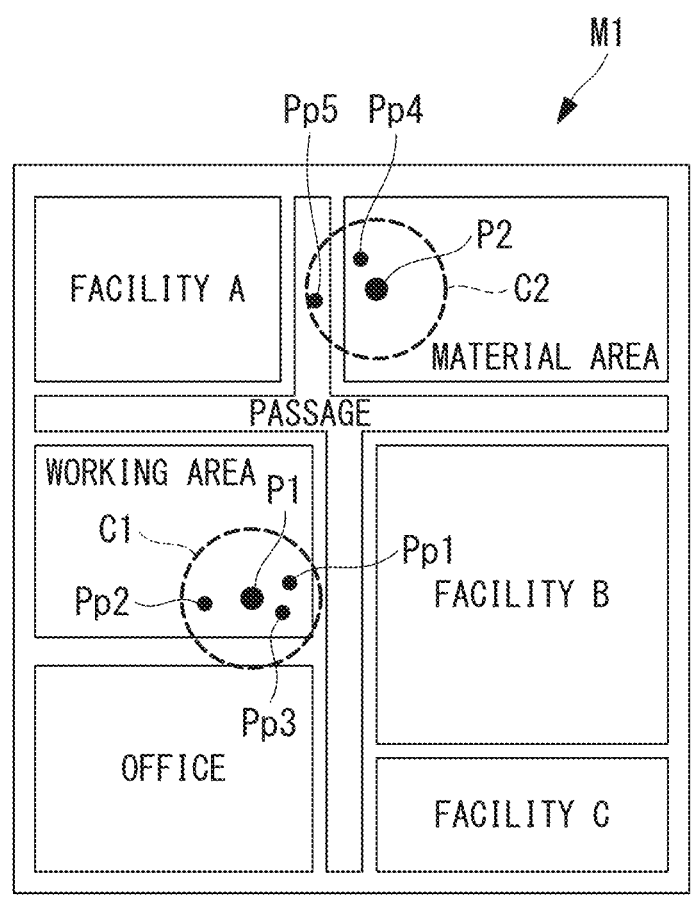
FIG. 4 is a diagram illustrating an example of a display window of a user terminal according to one embodiment of the present disclosure.

Accordingly, the related audit information is received on the user terminal 20 side to notify the user of the related audit information. Specifically, as illustrated in FIG. 4, at the user terminal 20, an audit position and a past audit position therearound (the circle C1 and the circle C2 of FIG. 4) are displayed over the map M1 of the manufacturing site. In the example of FIG. 4, the predetermined range is set as the circle C1 in association with an audit position P1, and past audit positions Pp1, Pp2, and Pp3 performed in the past within the range of the circle C1 are displayed. Further, a predetermined range is set as the circle C2 in association with an audit position P2, and past audit positions Pp4 and Pp5 performed in the past within the range of the circle C2 are displayed.

In such a way, an image that displays, over the map M1 of the manufacturing site, an audit position (a position where an audit is planned or a position where an audit is completed) and the past audit position is displayed on the user terminal 20.

When the inspector inputs an audit position as a position where an audit is planned to the user terminal 20 before performing the audit, the planned audit position and the past audit position corresponding to the planned audit position are displayed on the user terminal 20. This enables the inspector to recognize what audit was performed in the past at which position around the planned audit position. Accordingly, it is possible to effectively utilize the past audit achievement.

When the inspector inputs an audit position as a position where an audit is completed to the user terminal 20 during an audit, the completed audit position and the past audit position corresponding to the completed audit position are displayed on the user terminal 20. This enables the inspector to recognize what audit was performed in the past at which position around the completed audit position. Accordingly, it is possible to effectively utilize the past audit achievement.

Next, a specific window configuration on the user terminal 20 will be described.

FIG. 5 to FIG. 10 are diagrams illustrating examples of the window configuration on the user terminal 20.

Figure 5:
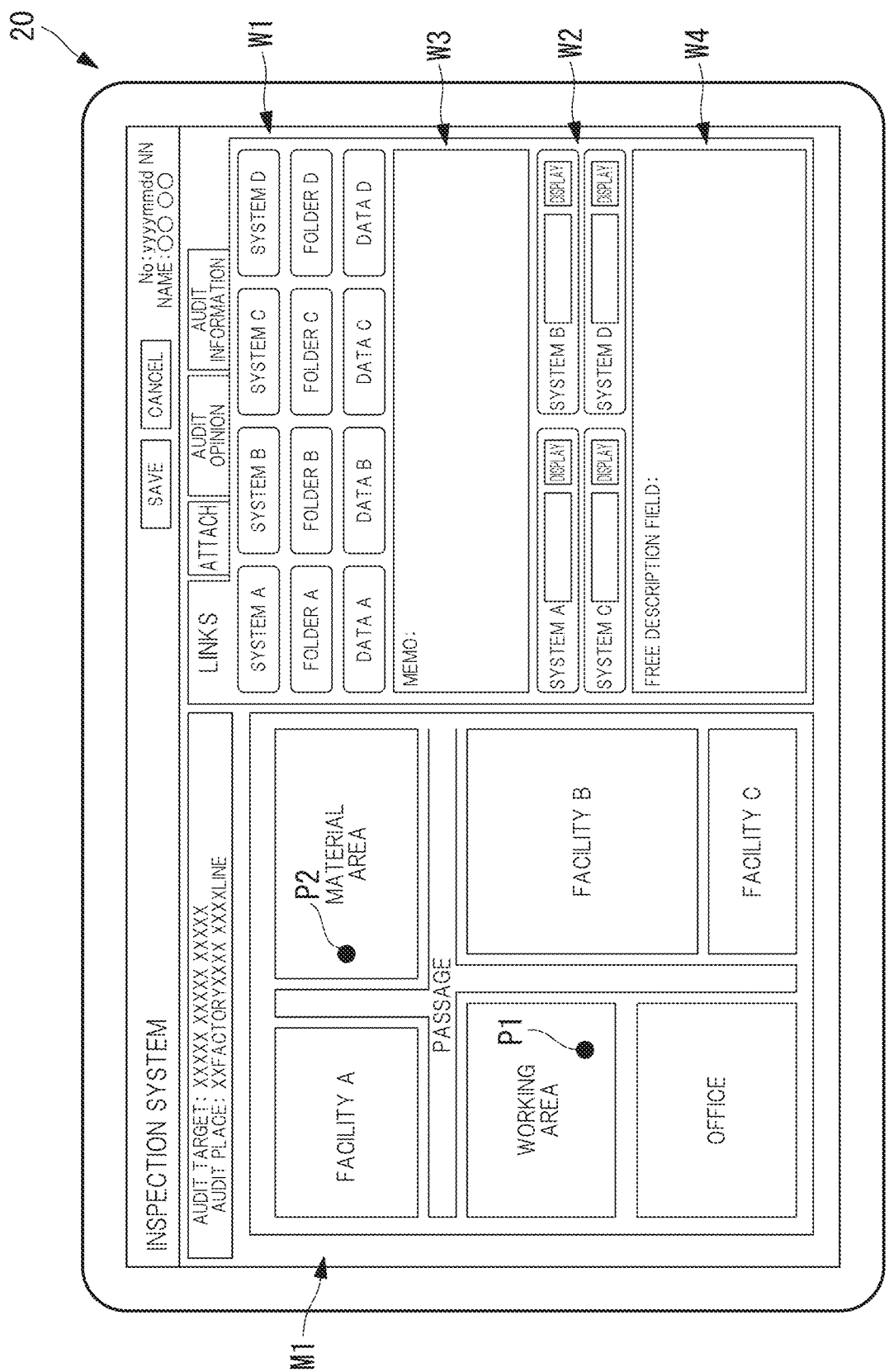
FIG. 5 is a diagram illustrating an example of a display window of the user terminal according to one embodiment of the present disclosure.

As illustrated in FIG. 5, the map M1 of the manufacturing site is displayed on the user terminal 20. The map M1 may be a layout drawing or may be a photograph as long as the configuration of the manufacturing site is represented.

Further, audit positions where an audit is planned are displayed over the map M1. For example, before the audit is performed, audit items are set in association with a manufacturing site to be audited. The audit item is information indicating a specific audit content. For example, the audit item is as to whether or not a target area is organized or the like. Then, once audit items are set, positions where audits for respective audit items are performed are set as planned audit positions. FIG. 5 illustrates the audit position P1 and the audit position P2. Note that, in this phase, the past audit position may be displayed as illustrated in FIG. 4. In performing an audit, the inspector references the planned audit position and performs an audit for a corresponding audit item. For example, a corresponding audit item may be displayed in response to designation of an audit position on the map M1. After performing an audit, the inspector sets a completed audit position on the map M1. For example, when an audit is performed at a planned audit position, the planned audit position and the completed audit position will be the same.

As illustrated in the upper left of the window of FIG. 5, information such as an audit target or an audit place may be displayed on the user terminal 20. As illustrated in the upper right of FIG. 7, setting of the audit report number and the name of logged-in user (inspector or the like) may be enabled on the user terminal 20.

As illustrated on the right side in the window of FIG. 5, displaying of various information related to the audit may be enabled on the user terminal 20. FIG. 5 illustrates display corresponding to a "Links" tab. For example, as illustrated as W1 of FIG. 5, various systems, folders, or data can be referenced. The system is a system used for management of a manufacturing site or a device, for example. As with W2 of FIG. 5, direct links to various systems are displayed, and searching for information intended to view through respective systems may be enabled. As illustrated as W3 and W4 of FIG. 5, a free entry field may be provided.

Figure 6:
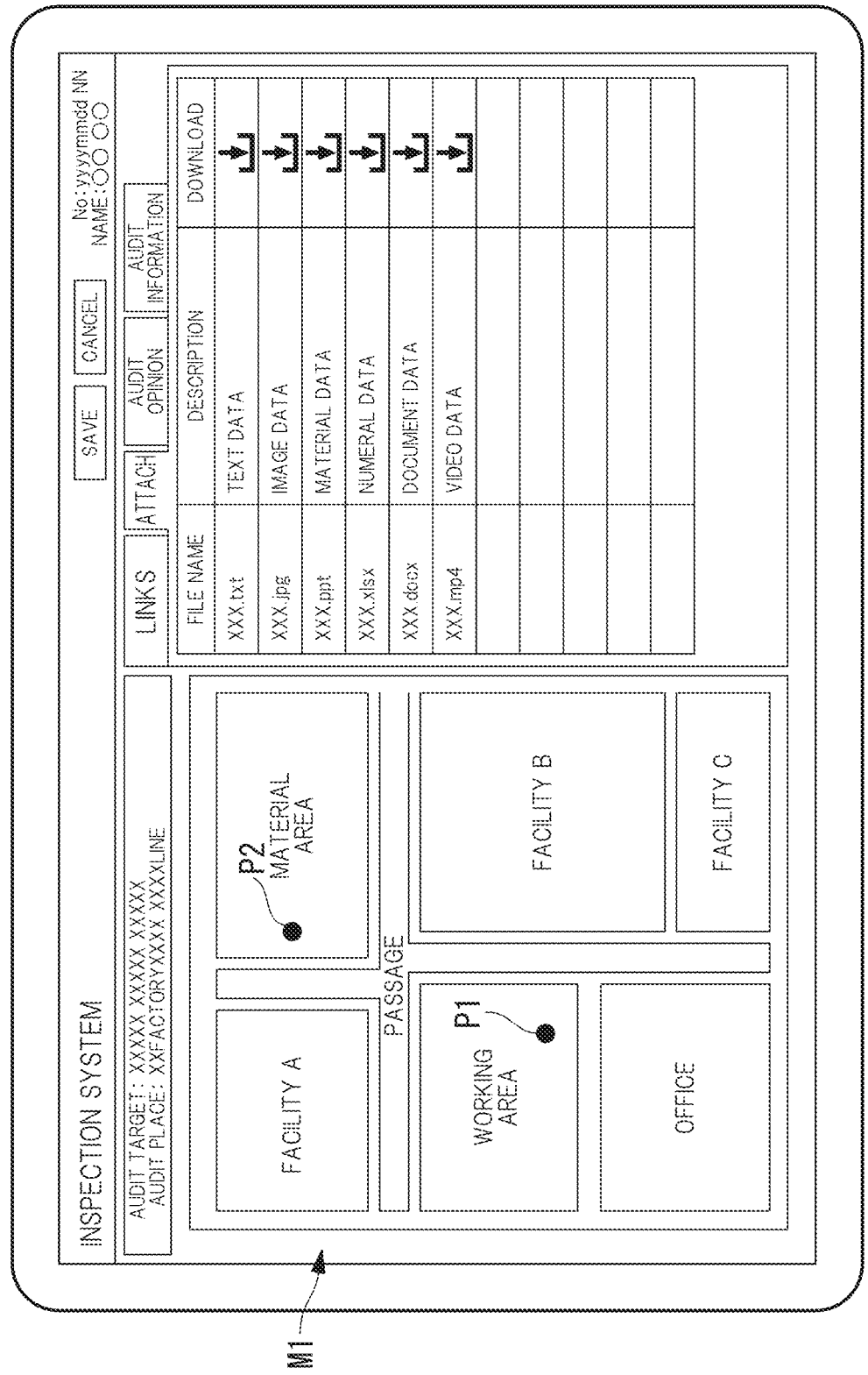
FIG. 6 is a diagram illustrating an example of a display window of the user terminal according to one embodiment of the present disclosure.

FIG. 6 illustrates display corresponding to an "Attach" tab on the right side in the window of FIG. 5. As illustrated in FIG. 6, attachment or download of various documents from the user terminal 20 may be enabled if necessary.

Figure 7:
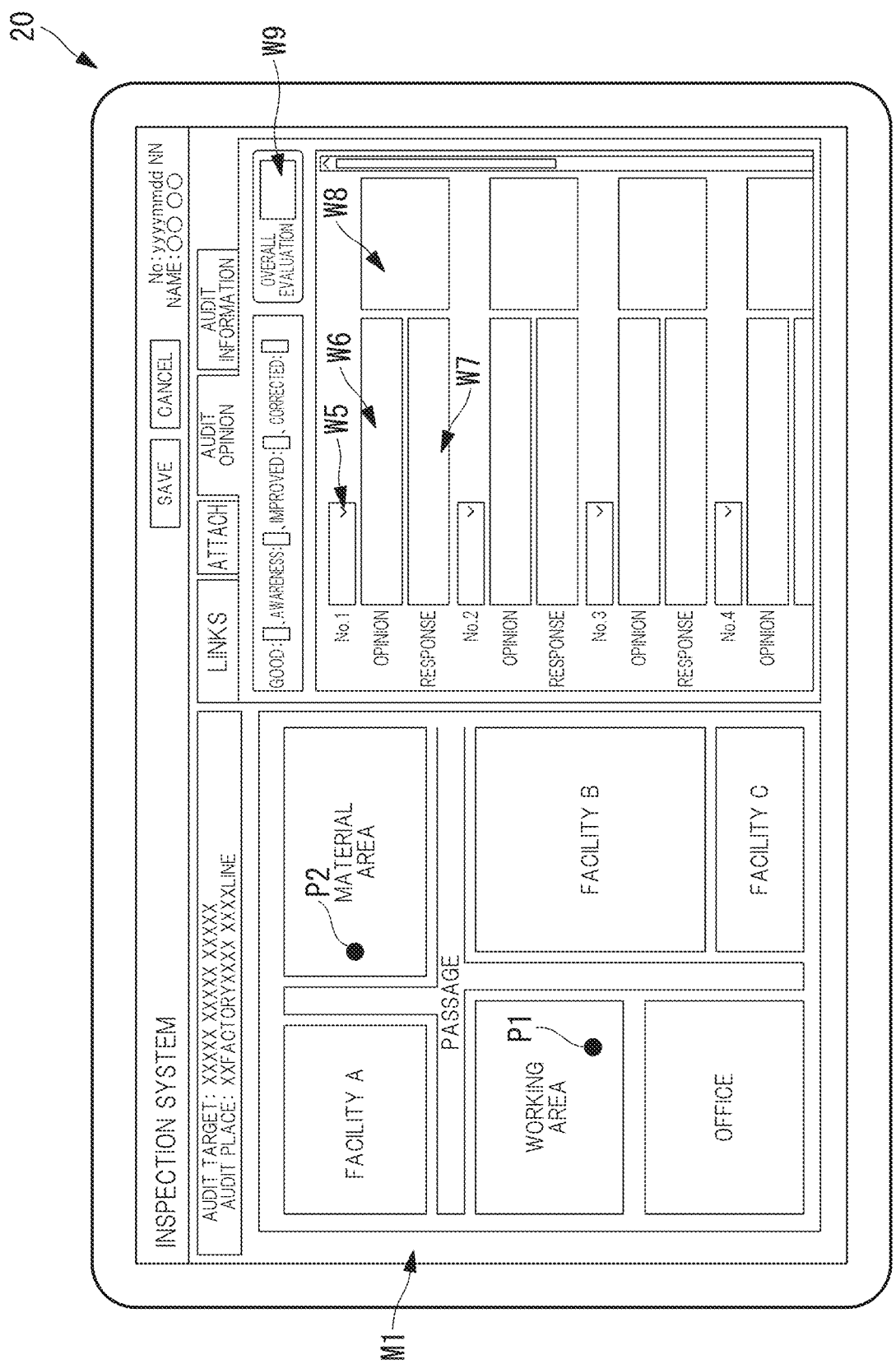
FIG. 7 is a diagram illustrating an example of a display window of the user terminal according to one embodiment of the present disclosure.

FIG. 7 illustrates display corresponding to an "Audit opinion" tab on the right side in the window of FIG. 5. As illustrated in FIG. 7, the inspector is able to input a result of the audit. Specifically, information indicating an audit result can be input in association with set audit positions (audit items), respectively. For example, as the information associated with P1, evaluations (for example, stepwise evaluation results such as good, minor, and critical) can be input in W5 of FIG. 7. An opinion on the audit can be input in association with the audit position in W6. Information on a measure (the content of a countermeasure) or the like (a response to an opinion or the like) associated with an audit position can be filled in W7. An image or the like can be attached in association with an audit position in W8.

Furthermore, as with W9 of FIG. 7, the overall evaluation of an audit result at each audit position may be automatically calculated and displayed. The overall evaluation is automatically calculated based on the evaluation (the evaluation in W7) at respective audit positions, for example.

Figure 8:
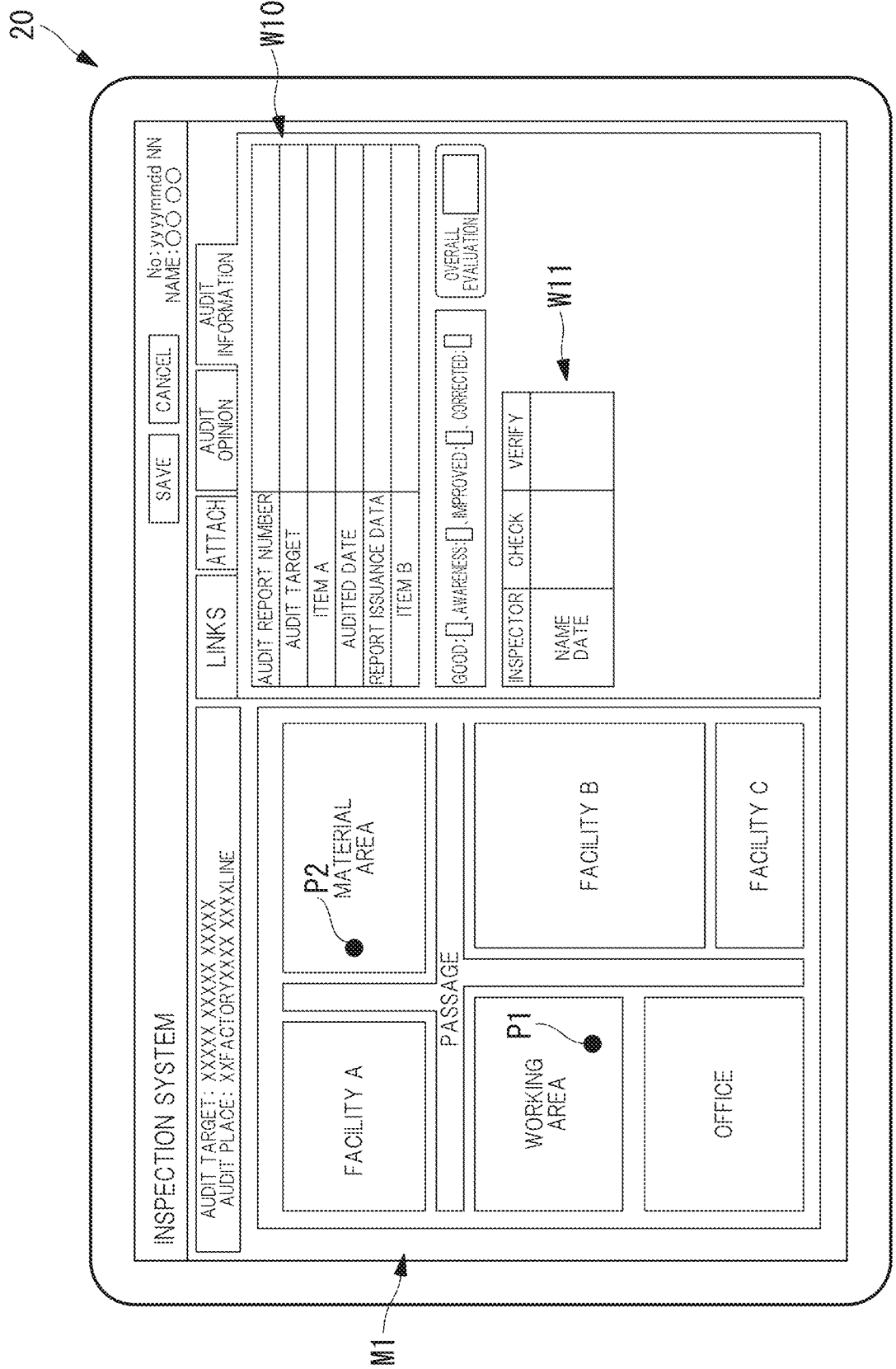
FIG. 8 is a diagram illustrating an example of a display window of the user terminal according to one embodiment of the present disclosure.

FIG. 8 illustrates display corresponding to an "Audit information" tab on the right side in the window of FIG. 5. As illustrated in W10 of FIG. 8, inputting of information such as the audit report number, the audit target, the audited date (audit date and time), the audit issuance date, or the like may be enabled. As illustrated in W11 of FIG. 8, an electronic signature field of a report may be provided.

Figure 9:
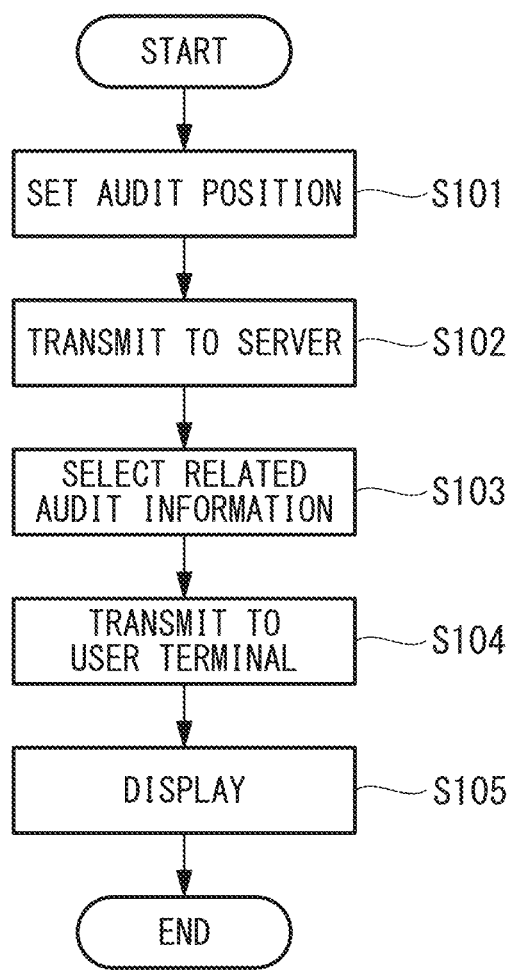
FIG. 9 is a flowchart illustrating an example of procedures of a process according to one embodiment of the present disclosure.

Next, an example of a process performed by the inspection system 1 described above will be described with reference to FIG. 9. FIG. 9 is a flowchart illustrating an example of procedures of the process according to the present embodiment.

First, the audit position is set at the user terminal 20 (S101). The set audit position may be a position where an audit is planned or may be a position where an audit is completed.

Next, the set audit position is transmitted from the user terminal 20 to the server 10 (S102).

Next, the transmitted audit position is defined as a target audit position, and related audit information indicating a position of an audit performed in the past in an area around the target audit position is selected from the past audit information (S103).

Next, the selected related audit information is transmitted from the server 10 to the user terminal 20 (S104).

Next, at the user terminal 20, the set audit position and an audit position where the audit was performed in the past in the area around the set audit position (the past audit position) are displayed over the map M1 of the manufacturing site (S105).

In such a way, once an audit position (which may be a position where an audit is planned or may be a position where an audit is completed) is set on the user terminal 20, a related past audit position is displayed on the user terminal 20.

As described above, according to the image and the inspection system according to the present embodiment, a set audit position and a past audit position that is a position of the past audit around the set audit position (within a predetermined range including the set audit position) are displayed over the map M1. Thus, an inspector is able to recognize the past audit position around an audit position indicating a position where an audit is planned or a position where an audit is completed. This makes it possible to perform an audit at a manufacturing site while referencing information on a past audit and achieve higher efficiency. That is, it is possible to effectively utilize information on the past audit.

The present disclosure is not limited to only the embodiment described above, and various modified implementations are possible within a scope not departing from the spirit of the present invention.

For example, in the past audit information, a level of importance may be set in association with an audit item or an audit position. The level of importance indicates a level of importance of an audit, which indicates that the associated audit item is important or that the associated audit position is important. The level of importance may be set in association with an audit item or may be set in association with an audit position (a position where an audit is planned or a position where an audit is completed). When a level of importance is set, display may be performed so that the level of importance is recognized (for example, in a prominent manner) when the audit position is displayed over the map M1.

Figure 10:
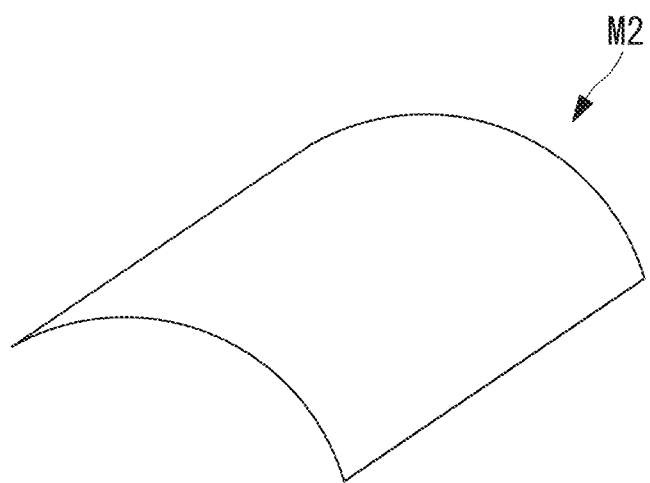
FIG. 10 is a diagram illustrating an example of a configuration diagram of a product according to one embodiment of the present disclosure.
Figure 11:
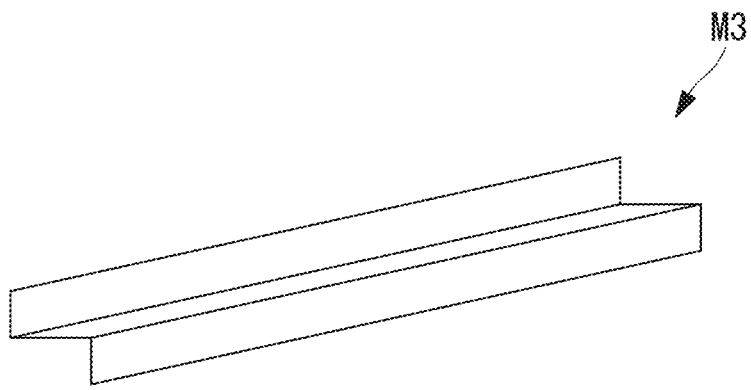
FIG. 11 is a diagram illustrating an example of a configuration diagram of a product according to one embodiment of the present disclosure.
Figure 12:
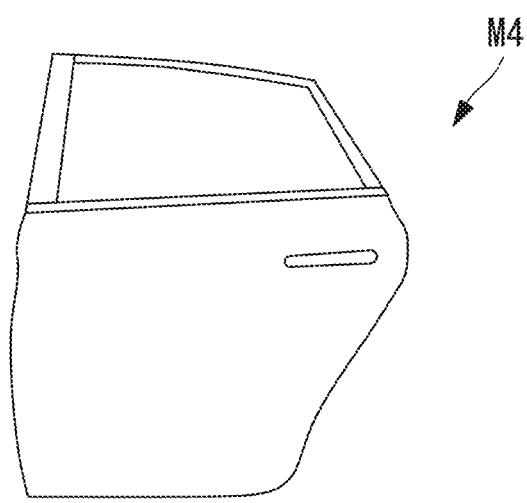
FIG. 12 is a diagram illustrating an example of a configuration diagram of a product according to one embodiment of the present disclosure.

Although the case where a manufacturing site is an audit target (inspection target) has been described in the present embodiment, the inspection target may be a product. That is, the inspection system may be applied to inspection on a product. In such a case, instead of the map M1 of the manufacturing site, a configuration diagram of a product is applied to an image displayed on a window. FIG. 10 is a diagram M2 illustrating a configuration diagram of a product. A configuration diagram of a product may be a drawing of the product or may be a photograph of the product and is not limited as long as the configuration of the product is represented. The type of products is not limited to a member of FIG. 10 and may be a member as with M3 of FIG. 11 or may be a member (a door of a vehicle) as with M4 of FIG. 12, and the embodiment is applicable to various products. Further, also when the inspection system is applied to such products, a process is performed in a similar manner to the example of the manufacturing site described above.

Figure 13:
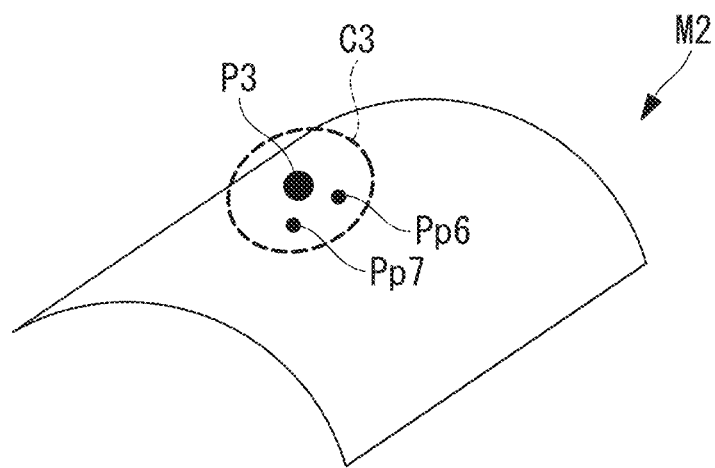
FIG. 13 is a diagram illustrating an example of a configuration diagram of a product according to one embodiment of the present disclosure.

In such a case, an image that displays, over a drawing representing the configuration of the product, an inspection position (a position where inspection is planned or a position where inspection is completed) and a past inspection position is displayed on the user terminal 20. In the example of FIG. 13, an inspection position is indicated as P3, and past inspection positions around the inspection position are indicated as Pp6 and Pp7 on the diagram M2. The area around an inspection position (target inspection position) is an area within a predetermined range including the inspection position. The predetermined range is not limited as long as a range around an inspection position is set. For example, the predetermined range is a range C3 surrounded by a circle having a radius of 0.5 m about an inspection position. The radius is not limited to 0.5 m and may be suitably set.

The image and the inspection system according to each embodiment described above are understood as follows, for example.

An image according to the present disclosure displays an inspection position indicating a position where inspection is planned or a position where inspection is completed (P1, P2) and a past inspection position indicating a position where inspection was performed in the past within a predetermined range including the inspection position (Pp1, Pp2, Pp3, Pp4, Pp5) over a drawing (M1) representing a configuration of a manufacturing site.

According to the image according to the present disclosure, an inspection position and a past inspection position that is a position of past inspection around the inspection position (within a predetermined range including the inspection position) are displayed over a drawing representing a configuration of a manufacturing site. Thus, an inspector is able to recognize the past inspection position around the inspection position indicating a position where inspection is planned or a position where inspection is completed. This makes it possible to perform inspection on a manufacturing site while referencing information on the past inspection and achieve higher efficiency.

An image according to the present disclosure displays an inspection position and a past inspection position over a drawing representing a configuration of a product, the inspection position indicating a position where inspection is planned or a position where inspection is completed, and the past inspection position indicating a position where inspection was performed in the past within a predetermined range including the inspection position.

According to the image according to the present disclosure, an inspection position and a past inspection position that is a position of past inspection around the inspection position (within a predetermined range including the inspection position) are displayed over a drawing representing a configuration of a product. Thus, an inspector is able to recognize the past inspection position around the inspection position indicating a position where inspection is planned or a position where inspection is completed. This makes it possible to perform inspection on a product while referencing information on the past inspection and achieve higher efficiency.

In the image according to the present disclosure, the predetermined range may be a range surrounded by a circle having a radius of 5 m about the inspection position.

According to the image according to the present disclosure, the predetermined range around an inspection position can be suitable set in a drawing representing a configuration of a manufacturing site.

In the image according to the present disclosure, the predetermined range may be a range surrounded by a circle having a radius of 0.5 m about the inspection position.

According to the image according to the present disclosure, the predetermined range around an inspection position can be suitable set in a drawing representing a configuration of a product.

An inspection system (1) according to the present disclosure includes a display unit (31) configured to display the image described above.

According to the inspection system according to the present disclosure, it is possible to display the image by using the display unit to provide information to the inspector. For example, the display unit is provided to the user terminal (20).

The inspection system according to the present disclosure may include a selection unit (43) configured to select information on the past inspection position within the predetermined range from past inspection information including position information on inspection performed in the past.

According to the inspection system according to the present disclosure, since the past inspection position within a predetermined range is selected from the past inspection information including position information on inspection performed in the past, it is possible to provide the past inspection position in association with an inspection position to the inspector.

In the inspection system according to the present disclosure, the past inspection information may include an inspection item associated with the inspection position.

According to the inspection system according to the present disclosure, because an inspection item and an inspection position are associated with each other, it is possible to reference the past inspection information to recognize what inspection is performed at which position.

In the inspection system according to the present disclosure, the past inspection information may include the inspection item, the inspection position, and a level of importance associated with each other.

According to the inspection system according to the present disclosure, because the inspection item, the inspection position, and a level of importance are associated with each other, the past inspection information can be configured by using the level of importance.

In the inspection system according to the present disclosure, the past inspection information may include information on at least any one of an inspector, an inspection date and time, or a countermeasure for the inspection item, which is associated with the inspection position.

According to the inspection system according to the present disclosure, more detailed past inspection information can be configured.

REFERENCE SIGNS LIST

1 inspection system
10 server
11 CPU
12 main memory
13 storage unit
14 external interface
15 communication interface
16 input unit
17 display unit
20 user terminal
31 display unit
32 input unit
33 communication unit
41 communication unit
42 storage unit
43 selection unit
M1 map

The invention claimed is:
1. An image that displays an inspection position and a past inspection position over a drawing representing a configuration of a manufacturing site,
   the inspection position indicating a position where inspection is planned or a position where inspection is completed, and
   the past inspection position indicating a position where inspection was performed in the past within a predetermined range including the inspection position, and the past inspection position being different from the inspecting position,
   wherein, once the inspection position is set, the inspection position and the past inspection position are displayed,
      the past inspection position being included in information on the past inspection position within the predetermined range, and
      the information on the past inspection position corresponding to the inspection position and being selected from past inspection information including position information on the inspection performed in the past, and
   the predetermined range is a range surrounded by a circle about the inspection position.

2. An image that displays an inspection position and a past inspection position over a drawing representing a configuration of a product,
  the inspection position indicating a position where inspection is planned or a position where inspection is completed, and
  the past inspection position indicating a position where inspection was performed in the past within a predetermined range including the inspection position, and the past inspection position being different from the inspecting position,
  wherein, once the inspection position is set, the inspection position and the past inspection position are displayed,
    the past inspection position being included in information on the past inspection position within the predetermined range, and
    the information on the past inspection position corresponding to the inspection position and being selected from past inspection information including position information on the inspection performed in the past, and
  the predetermined range is a range surrounded by a circle about the inspection position.

3. The image according to claim 1, wherein
the predetermined range is the range surrounded by the circle having a radius of 5 m about the inspection position.

4. The image according to claim 2, wherein
the predetermined range is the range surrounded by the circle having a radius of 0.5 m about the inspection position.

5. An inspection system comprising
a display unit configured to display the image according to claim 1.

6. The inspection system according to claim 5 further comprising
a selection unit configured to select the information on the past inspection position within the predetermined range from the past inspection information.

7. The inspection system according to claim 6, wherein
the past inspection information includes an inspection item associated with the inspection position.

8. The inspection system according to claim 7, wherein
the past inspection information includes the inspection item, the inspection position, and a level of importance associated with each other.

9. The inspection system according to claim 7, wherein
the past inspection information includes information on at least any one of an inspector, an inspection date and time, or a countermeasure for the inspection item, which is associated with the inspection position.

10. The inspection system according to claim 8, wherein
the past inspection information includes information on at least any one of an inspector, an inspection date and time, or a countermeasure for the inspection item, which is associated with the inspection position.

11. An inspection system comprising
a display unit configured to display the image according to claim 2.

12. The inspection system according to claim 11 further comprising
a selection unit configured to select the information on the past inspection position within the predetermined range from the past inspection information.

13. The inspection system according to claim 12, wherein
the past inspection information includes an inspection item associated with the inspection position.

14. The inspection system according to claim 13, wherein
the past inspection information includes the inspection item, the inspection position, and a level of importance associated with each other.

15. The inspection system according to claim 13, wherein
the past inspection information includes information on at least any one of an inspector, an inspection date and time, or a countermeasure for the inspection item, which is associated with the inspection position.

16. The inspection system according to claim 14, wherein
the past inspection information includes information on at least any one of an inspector, an inspection date and time, or a countermeasure for the inspection item, which is associated with the inspection position.

* * * * *